(12) United States Patent
Bando

(10) Patent No.: US 10,828,746 B2
(45) Date of Patent: Nov. 10, 2020

(54) DRESSING METHOD AND DRESSING APPARATUS

(71) Applicant: BANDO KIKO CO., LTD., Tokushima (JP)

(72) Inventor: Kazuaki Bando, Tokushima (JP)

(73) Assignee: BANDO KIKO CO., LTD., Tokushima (JP)

(*) Notice: Subject to any disclaimer, the term of this patent is extended or adjusted under 35 U.S.C. 154(b) by 143 days.

(21) Appl. No.: 15/747,488

(22) PCT Filed: Aug. 9, 2016

(86) PCT No.: PCT/JP2016/003677
§ 371 (c)(1),
(2) Date: Jan. 25, 2018

(87) PCT Pub. No.: WO2017/026121
PCT Pub. Date: Feb. 16, 2017

(65) Prior Publication Data
US 2018/0215009 A1   Aug. 2, 2018

(30) Foreign Application Priority Data

Aug. 10, 2015 (JP) .................. 2015-158582

(51) Int. Cl.
*B24B 53/00* (2006.01)
*B24B 53/013* (2006.01)
(Continued)

(52) U.S. Cl.
CPC .............. *B24B 53/013* (2013.01); *B24B 9/10* (2013.01); *B24B 53/04* (2013.01)

(58) Field of Classification Search
CPC .......... B24B 53/013; B24B 9/10; B24B 53/04
(Continued)

(56) References Cited

U.S. PATENT DOCUMENTS

| 2,635,399 A | * | 4/1953 | West, Jr. ................ B23Q 11/10 451/53 |
| 3,314,410 A | * | 4/1967 | Knauer ................... B24B 53/07 125/11.03 |

(Continued)

FOREIGN PATENT DOCUMENTS

| CN | 1085840 A | 4/1994 |
| CN | 1145047 A | 3/1997 |

(Continued)

OTHER PUBLICATIONS

Extended European Search Report dated Feb. 12, 2019 in European Application No. 16834822.5 (7 pages).

(Continued)

*Primary Examiner* — George B Nguyen
(74) *Attorney, Agent, or Firm* — Nixon & Vanderhye P.C.

(57) ABSTRACT

A dressing apparatus 1 includes a regulating body 13 which has a ridge portion 12 with a surface having a shape corresponding to the shape of a grinding surface 6 of a grinding wheel 5, the surface being brought into face-to-face contact, over a required length, with the grinding surface 6 of the grinding wheel 5 which rotates; a jetting abrasive grain generating device 11 serving as a device for generating a pressure fluid with abrasive grains mixed therein; and a jetting port 15 for jetting abrasive grain-mixed compressed air, the jetting port 15 serving as a jetting device for jetting the mixed compressed air as a pressure fluid with the abrasive grains mixed therein from the jetting abrasive grain generating device 11 into a space between the grinding surface 6 and the surface of the ridge portion 12 of the regulating body 13 which are brought into face-to-face contact with each other.

6 Claims, 6 Drawing Sheets

(51) Int. Cl.
*B24B 9/10* (2006.01)
*B24B 53/04* (2012.01)

(58) Field of Classification Search
USPC .................................................. 451/56
See application file for complete search history.

(56) References Cited

U.S. PATENT DOCUMENTS

| | | | | | |
|---|---|---|---|---|---|
| 4,020,820 | A | * | 5/1977 | Kish | B24B 53/00 125/11.01 |
| 4,027,648 | A | * | 6/1977 | Bonnice | B24B 53/00 125/11.01 |
| 4,068,416 | A | * | 1/1978 | Bonnice | B24B 53/00 125/11.01 |
| 5,235,959 | A | * | 8/1993 | Frank | B24B 53/013 125/11.01 |
| 5,472,371 | A | * | 12/1995 | Yamakura | B24B 1/00 125/11.18 |
| 6,036,584 | A | * | 3/2000 | Swinkels | B24C 1/04 451/75 |
| 6,273,795 | B1 | * | 8/2001 | Hatamoto | B24B 1/00 125/11.02 |
| 6,561,879 | B2 | * | 5/2003 | Voigt | B24B 53/065 125/11.04 |
| 2001/0024934 | A1 | * | 9/2001 | Ohmori | B24B 13/06 451/56 |
| 2008/0261496 | A1 | * | 10/2008 | Mase | B24C 7/0046 451/99 |
| 2009/0071303 | A1 | * | 3/2009 | Hashish | B24C 3/325 83/53 |

FOREIGN PATENT DOCUMENTS

| | | |
|---|---|---|
| CN | 1504294 A | 6/2004 |
| CN | 1686668 A | 10/2005 |
| CN | 101081490 A | 12/2007 |
| CN | 101288947 A | 10/2008 |
| CN | 101823237 A | 9/2010 |
| CN | 103273430 A | 9/2013 |
| CN | 203509957 U | 4/2014 |
| CN | 104755229 A | 7/2015 |
| EP | 0 645 214 A1 | 3/1995 |
| JP | 52-5024 Y | 2/1977 |
| JP | 54-115498 A | 9/1979 |
| JP | 55-055353 | 4/1980 |
| JP | 02-303767 | 12/1990 |
| JP | 5-253838 A | 10/1993 |
| JP | 6-91531 A | 4/1994 |
| JP | 7-132458 A | 5/1995 |
| JP | 08-012361 | 1/1996 |
| JP | 2005-313305 A | 11/2005 |
| JP | 2012-179692 A | 9/2012 |
| SU | 763075 | 9/1980 |
| TW | M494052 U | 1/2015 |
| WO | WO 2014/064855 | 5/2014 |

OTHER PUBLICATIONS

Chinese Office Action dated Jul. 25, 2019 in Chinese Application No. 201680046512.9, with English translation, 16 pages.
International Search Report for PCT/JP2016/003677, dated Sep. 20, 2016, 4 pages.
Decision on Rejection dated Jan. 17, 2020 in Chinese Application No. 201680046512.9, with English translation, 15 pages.
The First Examination Report dated Dec. 11, 2019 in Indian Application No. 201817001545, 6 pages.
Japanese Office Action dated Jul. 21, 2020 in Japanese Application No. 2017-118018, with English machine translation, 9 pages.
Taiwanese Office Action dated Aug. 12, 2020 in TW Application No. 106137822, with English machine translation, 12 pages.

\* cited by examiner

DRESSING METHOD AND DRESSING APPARATUS

This application is the U.S. national phase of International Application No. PCT/JP2016/003677 filed Aug. 9, 2016, which designated the U.S. and claims priority to JP Patent Application No. 2015-158582 filed Aug. 10, 2015, the entire contents of each of which are hereby incorporated by reference.

TECHNICAL FIELD

The present invention relates to a method of dressing the grinding surface of a grinding wheel and a dressing apparatus thereof.

Further, the present invention concerns a dressing method suitable for dressing the grinding surface of a grinding wheel for grinding an end face of a glass plate and a dressing apparatus therefor.

BACKGROUND ART

Conventionally, the dressing of the grinding surface of the grinding wheel is carried out by abutting a stick-like dresser against the grinding surface.

PRIOR ART DOCUMENT

Patent Document

Patent Document 1: WO 2014/064855

SUMMARY OF THE INVENTION

Problems that the Invention is to Solve

Patent Document 1 describes a technique in which a dresser is pressed against the grinding surface of a grinding wheel which rotates, so as to perform dressing. In such a technique, the dresser which is pressed against the grinding surface of the grinding wheel, if worn, must necessarily be replaced by a new one. However, since the dresser is tightened and fixed to a holder, this replacement operation involves time and trouble and is inefficient.

The present invention has been devised on the basis of the above-described aspects, and its object is to provide a dressing method capable of eliminating the above-described conventional drawback and performing good-quality dressing as well as an apparatus thereof.

Means for Solving the Problems

A dressing method for dressing a grinding surface in accordance with the present invention comprises the steps of: causing a regulating body conforming to a shape of a grinding surface of a grinding wheel to be brought into face-to-face contact, over a required length, with the grinding surface of the grinding wheel which rotates; jetting compressed air with abrasive grains mixed therein into a space between the grinding surface and the regulating body; passing the grinding surface in a rotating direction with respect to the regulating body; and maintaining a state of application of jetting force of the abrasive grains onto the grinding surface by means of the regulating body during the passage.

In addition, another dressing method for dressing a grinding surface in accordance with the present invention comprises the steps of: causing a regulating body conforming to a shape of a grinding surface of a grinding wheel to be brought into face-to-face contact, over a required length, with the grinding surface of the grinding wheel which rotates; jetting pressurized running water with abrasive grains mixed therein into a space between the grinding surface and the regulating body; passing the grinding surface in a rotating direction with respect to the regulating body; and maintaining a state of application of jetting force of the abrasive grains onto the grinding surface by means of the regulating body during the passage.

Furthermore, a dressing apparatus in accordance with the present invention comprises: a regulating body which has a surface having a shape corresponding to a shape of a grinding surface of a grinding wheel, the surface being brought into face-to-face contact, over a required length, with the grinding surface of the grinding wheel which rotates; a device for generating a pressure fluid with abrasive grains mixed therein; and a jetting device for jetting the pressure fluid with the abrasive grains mixed therein into a space between the grinding surface and the regulating body which are brought into face-to-face contact with each other.

In the present invention, as the abrasive grains, it suffices to use free abrasive grains of a material such as WA (white alundum, alumina base) or GC (Green carbonite, silicon carbide base) with a grain size of 180.

Advantages of the Invention

According to the present invention, in a state in which the rotating grinding surface and the regulating body conforming to the shape of the grinding surface are brought into face-to-face contact with each other, a fluid such as compressed air with abrasive grains mixed therein is jetted into a narrow space between the grinding surface and the regulating body in the rotating direction, whereby the abrasive grains are pressed against the grinding surface widely and over a long length by the fluid pressure of such as compressed air flow and by the regulation by the regulating body and the rotation of the grinding wheel, and move at high speed while rolling, thereby making it possible to perform the dressing of the grinding surface with high quality.

In addition, according to the present invention, since regulation is provided by the regulating body, dressing can be performed with a small amount of abrasive grains.

Furthermore, according to the present invention, the dressing apparatus can be mounted on a grinding head and is made to move together with the grinding head, so that the dressing of the grinding surface can be carried out while performing grinding.

MODE FOR CARRYING OUT THE INVENTION

Figure 1:
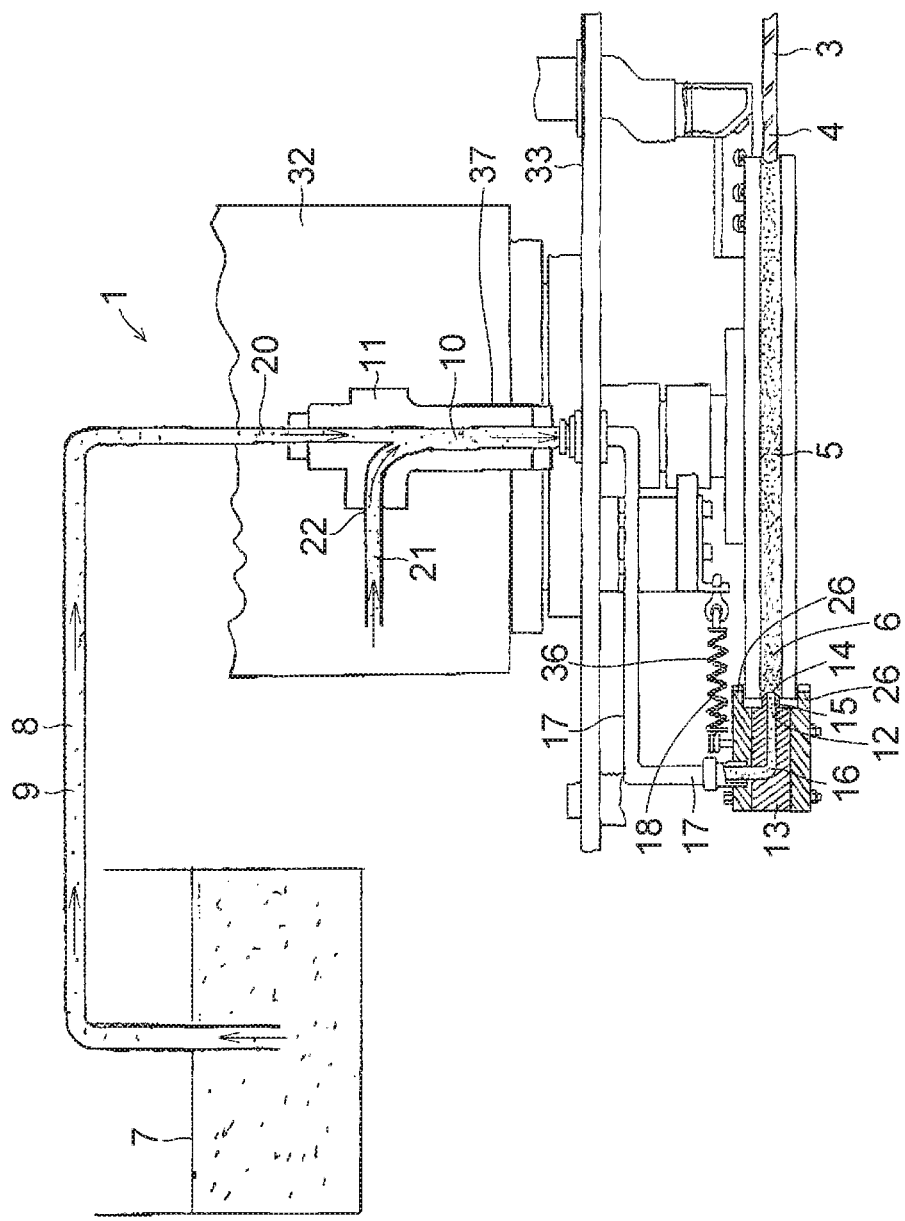
FIG. 1 is an explanatory cross-sectional view of a preferred embodiment of a dressing apparatus in accordance with the present invention.
Figure 2:
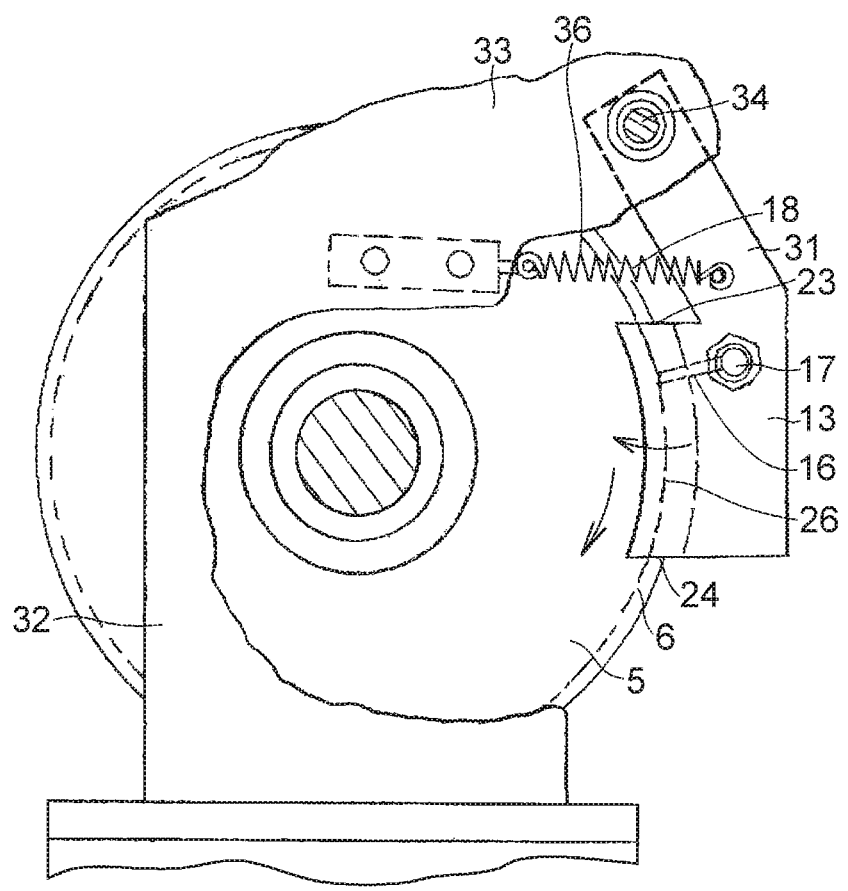
FIG. 2 is an explanatory partial plan view of the embodiment shown in FIG. 1.
Figure 3:
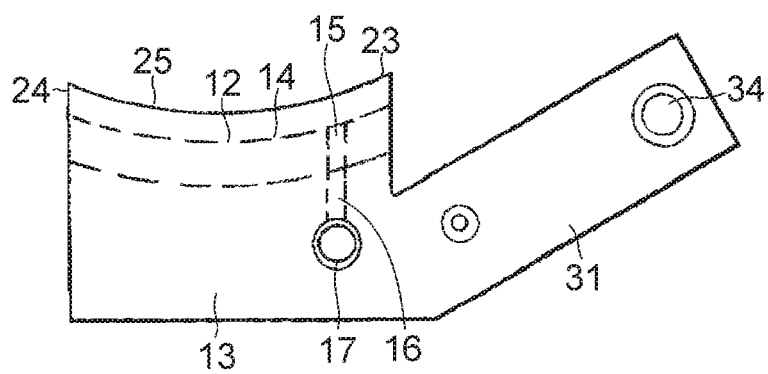
FIG. 3 is an explanatory plan view of a regulating body of the embodiment shown in FIG. 1.
Figure 4:
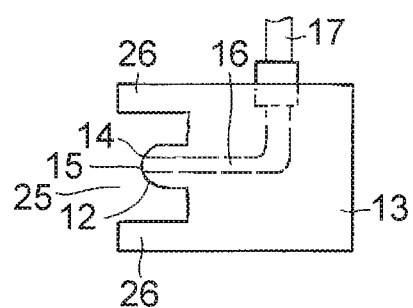
FIG. 4 is an explanatory front elevational view of the regulating body shown in FIG. 3.
Figure 5:
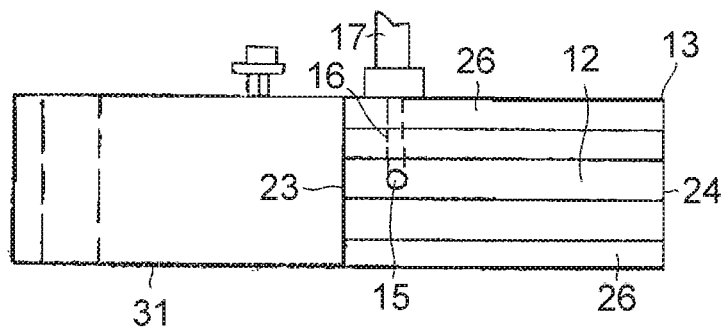
FIG. 5 is an explanatory side elevational view of the regulating body shown in FIG. 3.

Hereafter, a description will be given of the present invention and a mode for carrying it out on the basis of the preferred embodiments shown in the drawings. It should be noted that the present invention is not limited to these embodiments.

In FIGS. 1 to 5, in a dressing apparatus 1 of this embodiment which is applied to a pencil edge type grinding wheel 5 for grinding an end face 4 of a glass plate 3, compressed air 21 is used as a fluid which is jetted together with abrasive grains onto a grinding surface 6 of the grinding wheel 5.

The dressing apparatus 1 includes a jetting abrasive grain generating device 11 which sucks abrasive grains 9 from an abrasive grain tank 7 through a pipe 8, mixes the abrasive grains 9 with the compressed air 21, and jets the same; a regulating body 13 with a required length and having a ridge portion 12 which is brought into face-to-face contact with the grinding surface 6 of the grinding wheel 5; a jetting port 15 which is open at a top portion 14 of the ridge portion 12 to jet the abrasive grain-mixed compressed air; a communicating passage 16 and a pipe 17 for allowing the jetting port 15 and the jetting abrasive grain generating device 11 to communicate with each other; and an elastically pulling device 18 for causing the ridge portion 12 to contiguously oppose the grinding surface 6 of the grinding wheel 5 with resilient force.

The jetting port 15 expands toward an outlet side 24 and is formed such that an average diameter thereof becomes approximately 2 mm with respect to a 5 mm width of the grinding surface 6.

The jetting abrasive grain generating device 11 is constituted by a mixed compressed air generator 37 using a vacuum generator having an intake port 20 communicating with free abrasive grains inside the abrasive grain tank 7 by means of the pipe 8, a supply port 22 for supplying the compressed air 21, and a discharge port 10 for discharging the mixed compressed air of the compressed air 21 and the free abrasive grains 9.

The regulating body 13, which is formed of a plastic resin such as Bakelite resin, is formed such that its front side 25 ranging with a length of 40 mm to 60 mm from an inlet side 23 to an outlet side 24 is arcuately shaped by being concaved along the grinding wheel 5.

The regulating body 13 on its front side 25 has a pair of wall plates 26 formed at upper and lower sides so as to be U-shaped in its cross-sectional shape. The pair of wall plates 26 are adapted to sandwich the grinding wheel 5 to prevent the regulating body 13 from being dislocated from the grinding wheel 5 and prevent the jetted abrasive grains and compressed air 21 between the grinding surface 6 and the ridge portion 12 from being blown out to the outside.

In the regulating body 13, the ridge portion 12 is formed in an intermediate range between the pair of wall plates 26, and the ridge portion 12 is formed such that both its cross-sectional surface shape and its top surface shape from the inlet side 23 to the outlet side 24 conform to the shape of the grinding surface 6 of the grinding wheel 5. The jetting port 15 of the abrasive grain-mixed compressed air is open in the vicinity of the inlet side 23 at the top portion 14 of the ridge portion 12.

The jetting port 15 communicates with the jetting abrasive grain generating device 11 through the communicating passage 16 inside the regulating body 13 as well as a joint and the pipe 17.

A mounting portion 31 is integrally provided on the regulating body 13, and the mounting portion 31, which is mounted on a cover bracket 33 of a grinding head 32 through a pivotally supporting unit 34, holds the regulating body 13 to allow the regulating body 13 to swingingly rotate retractably in the horizontal direction with respect to the grinding wheel 5.

A tension coil spring 36 of the elastically pulling device 18 is stretched between the mounting portion 31 and the cover bracket 33, and the mounting portion 31, the regulating body 13, and, hence, the ridge portion 12 are brought into face-to-face contact with the grinding surface 6 of the grinding wheel 5 with a resiliently pressing force, e.g., 1.2 Kg on average in a preferred example, by the elastically pulling device 18 provided with the tension coil spring 36.

As described above, the dressing apparatus 1 is comprised of the regulating body 13 which has the ridge portion 12 with a surface having a shape corresponding to the shape of the grinding surface 6, the surface being brought into face-to-face contact, over a required length, with the grinding surface 6 of the grinding wheel 5 which rotates; the jetting abrasive grain generating device 11 serving as a device for generating a pressure fluid with abrasive grains mixed therein; and the jetting port 15 for jetting abrasive grain-mixed compressed air, the jetting port 15 serving as a jetting device for jetting the mixed compressed air as the pressure fluid with the abrasive grains mixed therein from the jetting abrasive grain generating device 11 into the space between the grinding surface 6 and the surface of the ridge portion 12 of the regulating body 13 which are brought into face-to-face contact with each other.

The dressing apparatus 1 is adapted to perform the dressing of the grinding surface 6 by causing the regulating body 13 conforming to the shape of the grinding surface 6 to be brought into face-to-face contact, over a required length, with the grinding surface 6 of the grinding wheel which rotates, by jetting the compressed air 21 with the abrasive grains mixed therein into the space between the grinding surface 6 and the regulating body 13, by passing the grinding surface 6 in the rotating direction with respect to the regulating body 13, and by causing the elastically pulling device 18 to maintain the state of application of the jetting force of the abrasive grains onto the grinding surface 6 due to the regulating body 13 during this passage.

Figure 6:
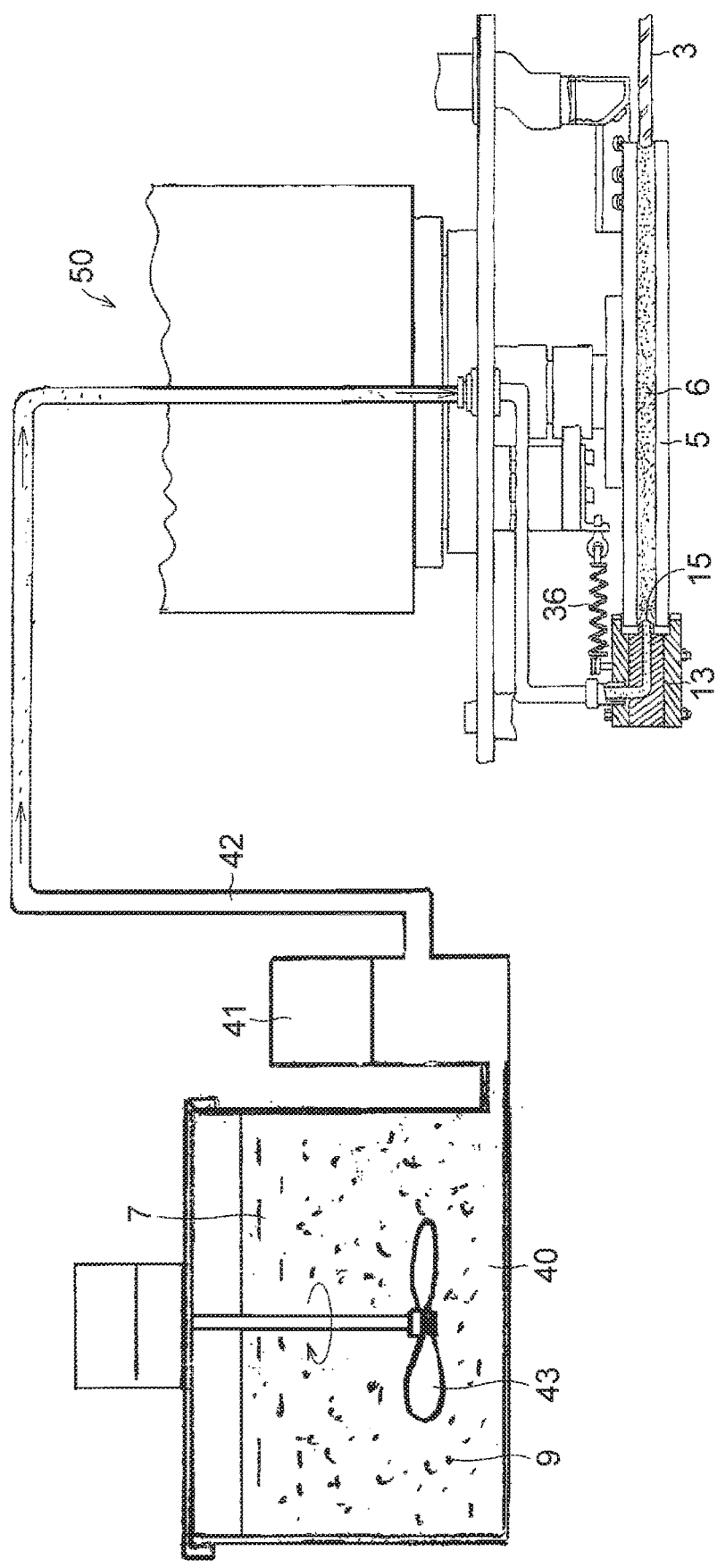
FIG. 6 is an explanatory cross-sectional view of another preferred embodiment of the dressing apparatus in accordance with the present invention.

A dressing apparatus 50 in accordance with another embodiment of the present invention shown in FIG. 6 jets the abrasive grains 9 with which pressurized water 40 is mixed, and is adapted to suck by a water pump 41 the pressurized water 40 with the abrasive grains 9 mixed therein by a mixer 43, and pressure feed abrasive grain-mixed pressure water 42 from the water pump 41 to the jetting port 15 of the regulating body 13, so as to jet the abrasive grain-mixed pressure water 42 from the jetting port 15 of the regulating body 13 onto the grinding surface 6.

The dressing apparatus 50 shown in FIG. 6 is adapted to perform the dressing of the grinding surface 6 by causing the regulating body 13 conforming to the shape of the grinding surface 6 to be brought into face-to-face contact, over a required length, with the grinding surface 6 of the grinding wheel 5 which rotates, by jetting the abrasive grain-mixed pressure water 42 serving as pressurized running water with the abrasive gains mixed therein into the space between the grinding surface 6 and the regulating body 13, by passing the grinding surface 6 in the rotating direction with respect to the regulating body 13, and by causing the elastically pulling device 18 to maintain the state of application of the jetting force of the abrasive grains onto the grinding surface 6 due to the regulating body 13 during this passage.

It should be noted that, instead of the tension coil spring 36, an air cylinder unit may be used for the elastically pulling device 18.

DESCRIPTION OF REFERENCE NUMERALS

1: dressing apparatus
6: grinding surface
13: regulating body

The invention claimed is:

1. A dressing method for dressing a grinding surface, comprising the steps of:
 causing a regulating body conforming to a shape of a grinding surface of a grinding wheel to be brought face-to-face, over a required length, with the grinding surface of the grinding wheel which rotates with resilient force;
 jetting compressed air with abrasive grains mixed therein into a space between the grinding surface and the regulating body;
 passing the grinding surface in a rotating direction with respect to the regulating body; and
 maintaining a state of application of jetting force of the abrasive grains onto the grinding surface by means of the regulating body during the passage.

2. A dressing method for dressing a grinding surface, comprising the steps of:
 causing a regulating body conforming to a shape of a grinding surface of a grinding wheel to be brought face-to-face, over a required length, with the grinding surface of the grinding wheel which rotates with resilient force;
 jetting pressurized running water with abrasive grains mixed therein into a space between the grinding surface and the regulating body;
 passing the grinding surface in a rotating direction with respect to the regulating body; and
 maintaining a state of application of jetting force of the abrasive grains onto the grinding surface by means of the regulating body during the passage.

3. A dressing apparatus comprising:
 a regulating body which has a surface having a shape corresponding to a shape of a grinding surface of a grinding wheel, the surface being brought face-to-face, over a required length, with the grinding surface of the grinding wheel which rotates;
 a device for generating a pressure fluid with abrasive grains mixed therein;
 a jetting device for jetting the pressure fluid with the abrasive grains mixed therein into a space between the grinding surface and the regulating body; and
 an elastically pulling device for causing the abrasive jetting surface to oppose the grinding surface with resilient force.

4. A dressing method for dressing a grinding surface while grinding a glass plate, comprising the steps of:
 causing a regulating body conforming to a shape of a grinding surface of a grinding wheel to be brought face-to-face, over a required length, with the grinding surface of the grinding wheel which rotates;
 jetting compressed air with abrasive grains mixed therein into a space between the grinding surface and the regulating body;
 passing the grinding surface in a rotating direction with respect to the regulating body; and
 maintaining a state of application of jetting force of the abrasive grains onto the grinding surface by means of the regulating body during the passage.

5. A dressing method for dressing a grinding surface while grinding a glass plate, comprising the steps of:
 causing a regulating body conforming to a shape of a grinding surface of a grinding wheel to be brought face-to-face, over a required length, with the grinding surface of the grinding wheel which rotates;
 jetting pressurized running water with abrasive grains mixed therein into a space between the grinding surface and the regulating body;
 passing the grinding surface in a rotating direction with respect to the regulating body; and
 maintaining a state of application of jetting force of the abrasive grains onto the grinding surface by means of the regulating body during the passage.

6. A dressing apparatus comprising:
 a regulating body which has a surface having a shape corresponding to a shape of a grinding surface of a grinding wheel, the surface being brought face-to-face, over a required length, with the grinding surface of the grinding wheel which rotates;
 a device for generating a pressure fluid with abrasive grains mixed therein; and
 a jetting device for jetting the pressure fluid with the abrasive grains mixed therein into a space between the grinding surface and the regulating body,
 said dressing apparatus being adapted to perform the dressing of the grinding surface while grinding the glass plate.

* * * * *